United States Patent [19]

Dernbach et al.

[11] Patent Number: 5,363,442
[45] Date of Patent: Nov. 8, 1994

[54] RETROFIT INTERFACE APPARATUS AND METHOD FOR REMOTE ISOLATION DEVICES

[75] Inventors: Donald F. Dernbach, El Cajon; Donald W. Perkins, Bonita, both of Calif.

[73] Assignee: Training Delivery Services, Inc., Irvine, Calif.

[21] Appl. No.: 937,976

[22] Filed: Aug. 31, 1992

[51] Int. Cl.⁵ ............................................. H04M 9/00
[52] U.S. Cl. ..................................... 379/412; 379/397
[58] Field of Search ................... 379/2, 327, 397, 412; 361/385

[56] References Cited

U.S. PATENT DOCUMENTS

| | | | |
|---|---|---|---|
| 3,773,986 | 11/1973 | Tremblay | 379/412 |
| 4,624,514 | 11/1986 | Smith | 379/412 |
| 4,800,588 | 1/1989 | Poster, Jr. | 379/412 |

Primary Examiner—Carl D. Friedman
Assistant Examiner—Creighton Smith
Attorney, Agent, or Firm—Knobbe, Martens, Olson & Bear

[57] ABSTRACT

An apparatus and a method for retrofitting RIDs onto conventional surge protectors at the boundary between a subscriber's telephone lines and the telephone company's wiring comprises a mounting unit which serves as an interface between the surge protector and the RID. The mounting unit connects to the surge protector terminals and retains a RID device. The mounting unit includes connection terminals which receive incoming subscriber wires and form a conductive contact between the subscriber terminals and the RID terminals. In one aspect of the invention, the mounting unit is configured so that the mounting unit as well as the attached RID both fit conveniently beneath the already existing surge protector housing. In a further aspect of the invention, the mounting unit may be configured to interface with a variety of differently configured surge protector devices. In still another aspect of the invention, intermediate mounting brackets are used in conjunction with the mounting units. In yet another embodiment of the invention, the RID is configured so that the RID fits conveniently within the normal jumper path between the columns of an industrial surge protector device.

19 Claims, 13 Drawing Sheets

RETROFIT INTERFACE APPARATUS AND METHOD FOR REMOTE ISOLATION DEVICES

BACKGROUND OF THE INVENTION

1. Field of the Invention

The present invention relates to retrofit interface units which are used to connect remote isolation devices to existing surge protectors.

2. Description of the Related Art

Remote isolation devices (RIDs) are commonly used to isolate a subscriber's circuitry from a telephone company's circuitry at a remote location. In the past, telephone companies have been required to service telephone lines and circuitry both inside and outside of a subscriber's home. Some time ago, however, changes in the law have resulted in telephone companies only being responsible for maintaining circuitry outside of the subscriber's house, and typically not being responsible for failed circuitry within the subscriber's house. Thus, the subscriber must hire an independent contractor or pay the phone company a service fee in order to have a professional service the telephone circuitry within the home. The RIDs allow the telephone company to determine whether or not a circuit fault exists in the wiring belonging to the telephone company or the wiring belonging to the subscriber. This affords considerable savings to the telephone company since the telephone company is not required to send out service personnel to inspect the wiring. The magnitude of these savings is further augmented due to the large volume of subscriber's (on the order of several millions) which telephone companies service. Therefore, RIDs have become very desirable due to the increased savings which these devices have rendered to telephone companies.

Because of the desirability of equipping a subscriber's home or business with RIDs, a number of schemes have been developed to retrofit these devices onto the terminals defining the boundary between the telephone company's circuitry and the subscriber's circuitry. Currently, telephone companies intend to retrofit each of the houses which does not already have an RID device connected at the telephone company/subscriber interface by going from home to home and installing retrofit RID devices. Because of the huge volume of customers involved in this retrofitting process, even small time or cost savings for each installation may add up to a considerable savings overall. Therefore, it is extremely important that the retrofitting of the RID devices be accomplished in as little timed and with as little cost as possible.

In most homes and businesses, the boundary between the subscriber and the telephone company lines is located at an over-voltage surge protector device which is normally located on a wall outside of a home, or in an electrical closet in a business. Thus, a number of retrofitting devices have been provided in the past to connect the RIDs to the terminals of a surge protector at the interface between the subscriber's wiring and the telephone company's wiring.

For example, one prior device, disclosed in U.S. Pat. No. 4,800,588, comprises a housing which is mounted onto the outside wall of a subscriber's home. The housing has a plurality of selectively accessible compartments which may contain circuitry such as an RID device. This and other such housings are typically very expensive and bulky. Further, these devices typically require a significant amount of installation time, and the drilling of holes into a homeowner's wall. In addition, due to their size, these retrofitting devices often take up large amounts of wall space so that it may not be feasible to mount such a device near a surge protector where wall space is limited. As a result, servicemen are often required to run extension lines from the surge protector to the mounting device, thereby increasing installation time, not to mention the aesthetically displeasing effects of such extensions.

In most businesses having multiple subscriber input lines, the surge protector devices consist of a series of separated terminals wherein all pairs of the subscriber terminals are located in one housing column and all pairs of the telephone company terminals are located in a second housing column. Each pair of subscriber terminals, with their corresponding pair of telephone company terminals, corresponds to a single, outside telephone line. A common example of such a multiple subscriber terminal is a conventional 66 block surge protector. Prior devices have also been developed for mounting RIDs onto such multiple subscriber terminals. For example, in one prior device a housing which encapsulates a RID includes a clip that fits over the subscriber column or the telephone company column. However, because each subscriber pair requires its own RID, this method of mounting RIDs proves very cumbersome. This is because the mounting apparatus extends over the face of the connecting block so that the RID not only covers the terminals to which it is connected, but also interferes with work being performed on adjacent terminals. Therefore, when it is required to service the multiple subscriber terminals, the RIDs which cover each terminal pair often become an obstruction which results in increased labor costs each time one of the multiple subscriber surge protectors is serviced. As the RID is largely for the telephone companies benefit, business consumers sometimes are unwilling to permit RIDs to be installed on block surge protectors because they increase labor costs for repairs which are the responsibility of the subscriber.

Therefore a need exists for a mounting apparatus which may be used to retrofit RIDs onto existing surge protectors, either in individual homes or businesses, without exhibiting the aforesaid disadvantages.

SUMMARY OF THE INVENTION

One important aspect of the invention is a retrofit interface apparatus including a remote isolation device and a mounting unit. The remote isolation device includes a pair of subscriber leads and a pair of provider leads. The mounting unit includes a body, a fastener portion on the body securing the remote isolation device to the body, a receiving element for receiving a pair of surge posts and a ground post attachment device. Desirably, the apparatus further includes a pair of terminals securing the subscriber wires to the body. Preferably, the ground post attachment device is an opening for receiving a ground post for a surge protector. The opening may be either an aperture or a notch, depending upon the size of the body and other considerations. Advantageously, the body of the mounting unit is sized and shaped such that, when the apparatus is mounted on the surge protector, the surge protector and the apparatus are housed by the surge protector housing.

Another aspect of the invention is a method of mounting a remote isolation device on a building upon which has previously been mounted a surge protector device and housing therefor. The method includes mounting the remote isolation device on a mounting unit having a body, a pair of openings for receiving the surge posts of a surge protector, and a ground post attachment opening. The housing is removed from the surge protector and the mounting unit is inserted over the surge protector device so that the openings of the surge protector device receive the surge post, and the ground post attachment opening receives the ground post. The mounting unit is secured to the surge protector device by tightening the ground post nut against the body. The housing is secured over the surge protector, the remote isolation device and the mounting unit.

Another aspect of the invention is a remote isolation device which attaches between spaced subscriber and telephone company terminals of a surge protector device. The remote isolation device includes an elongate body having a slim profile; a first pair of leads which connects with the subscriber terminal and a second pair of leads which connects with the telephone company terminals. Advantageously, the first pair of leads extend from one end of the body and the second pair of leads extend from the opposite end of the body so that the leads suspend the remote isolation device between the subscriber and telephone company terminals.

DETAILED DESCRIPTION OF THE INVENTION

The present invention has a number of different aspects. To more clearly describe each of these aspects, several alternative embodiments of the invention are described in detail below with reference to FIGS. 1-14.

Figure 1:
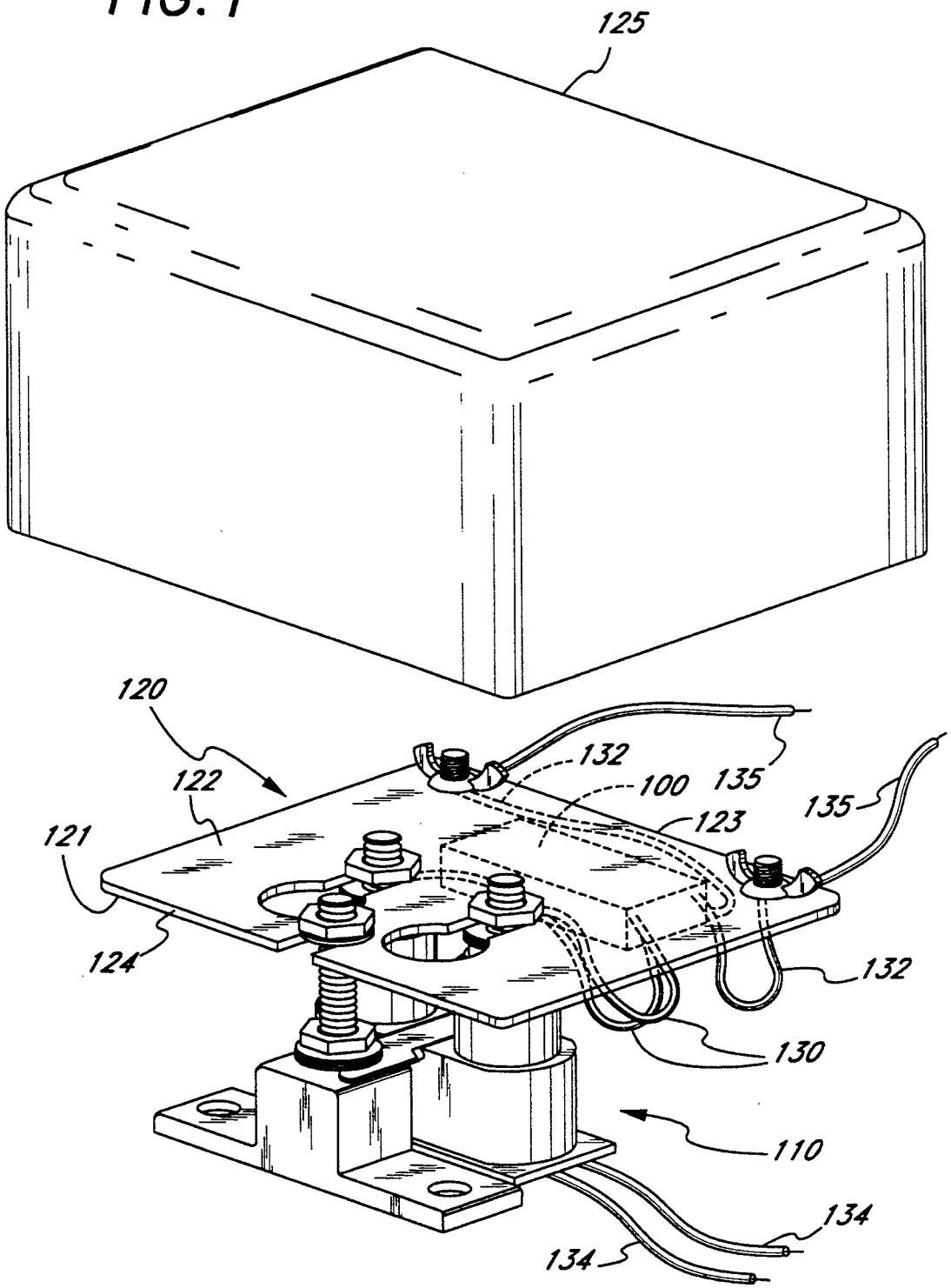
FIG. 1 is a perspective assembly view of the retrofit RID interface apparatus of the present invention as connected with a conventional surge protector device.

FIG. 1 is an assembly view of a surge protector/RID assembly 97, including a retrofit RID interface apparatus 99 connected to a surge protector device 110. The RID interface apparatus 99 includes a RID 100 containing conventional isolation circuitry such as, for example, RID Model No. 90599 UTU/MTU manufactured by KEPTEL. The RID 100 Includes two terminal wire pairs 130, 132 which extend from the RID 100. As shown in FIG. 1, the provider terminal lead pair 130 is for connection with telephone company wiring 134, which extend from the base of the surge protector 110, while the subscriber terminal lead pair 132 is for connection with subscriber wiring 135. The surge protector device 110 is a conventional, dual-terminal, single-home over-voltage protector and is typically mounted onto a wall at the side of a house, as is well known in the art. Approximately 90% of homes have dual-terminal-post surge protector devices similar to the surge protector device 110 shown in FIG. 1. The RID 100 is retrofitted onto the surge protector 110 by means of a mounting unit 120 in accordance with the teachings of the present invention. The mounting unit 120 is a generally flat, rectangular body, having an inner, flat surface 121 (i.e., the surface facing the surge protector 110), an outer flat surface 122 (i.e., the surface facing the housing 125), a top edge 123, and a bottom edge 124. The surge protector/RID assembly 97 also includes a housing 125 shown as elevated above the surge protector 110 and interface apparatus 99 in FIG. 1. In this embodiment, the housing 125 is advantageously the same housing used to cover and protect the surge protector 110 prior to retrofit installation of the RID 100. Thus, in this embodiment, the mounting unit 120 attaches to the surge protector 110 and is configured so that the entire surge protector/RID assembly 99 (including the surge protector 110, the RID 100, and the mounting unit 120) fits within the space provided by the assembly's housing structure 125.

Figure 2:
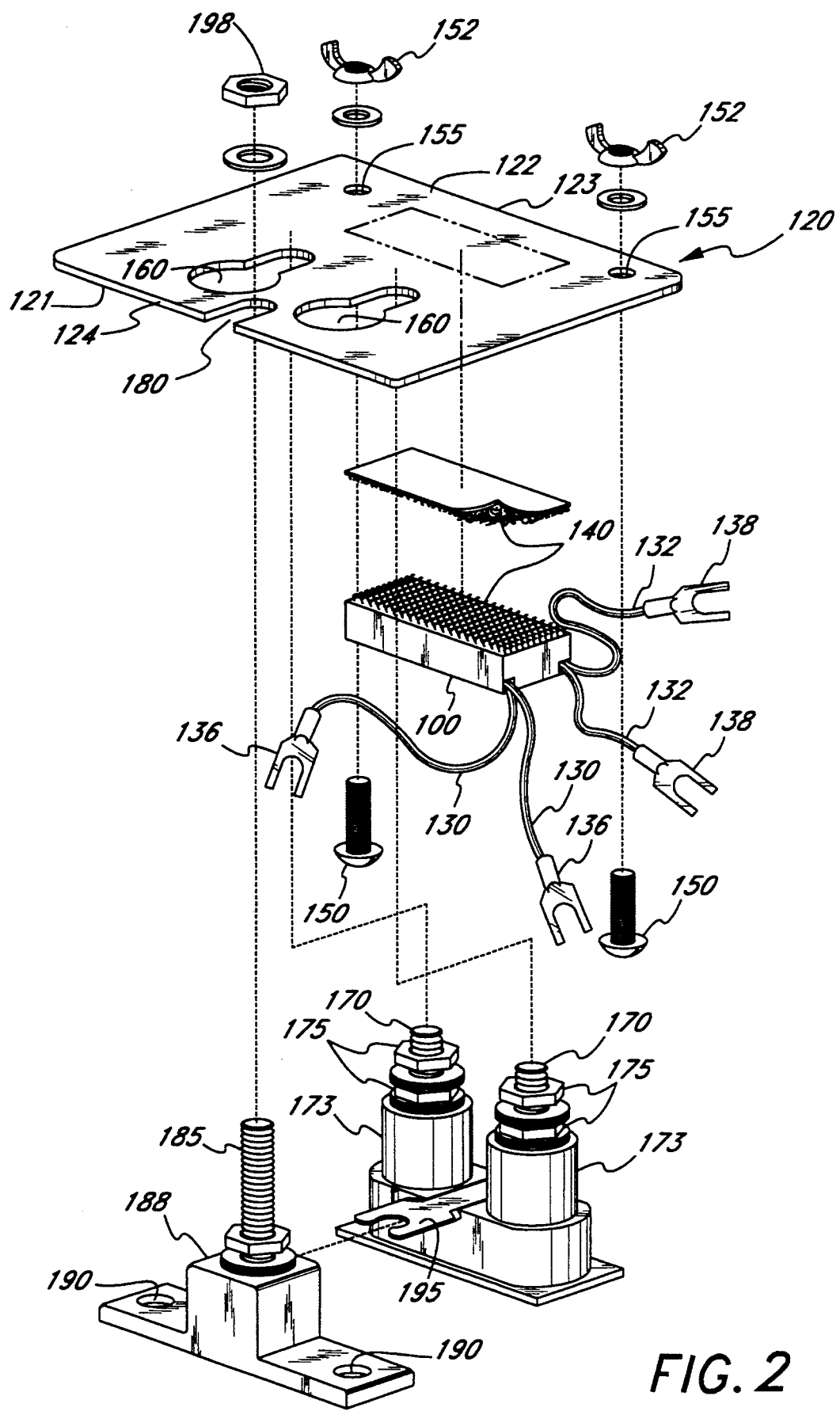
FIG. 2 is an exploded assembly view showing the structural elements of the interface apparatus, the RID, and the surge protector device of FIG. 1.

FIG. 2 is an exploded assembly view which shows each of the elements of the surge protector/RID assembly 97 of FIG. 1 more distinctly. Each of the wire pairs 130, 132 is provided with two end connectors 136, 138, respectively. The RID 100 is generally rectangular box in shape with both pairs of the wires 130, 132 extending from one end of the RID 100. One portion of a hook and loop fastener or Velcro ® strip 140 is fastened to the surface of the RID 100, while a mating portion of a loop and hook fastener or mating Velcro ® strip 140 is attached to the inside surface 121 of the mounting unit 120.

A pair of terminal screws 150 are inserted into holes 155 formed within the mounting unit 120. The terminal screws 150 engage with a pair of wing nuts 152 on the opposite side of the mounting unit 120. As the wing nuts 152 are advanced along the threaded shaft of the screw 150, the heads of the screws 150 are drawn towards the wing nuts. Thus, when the wing nuts 152 are in contact with the bottom surface of the mounting unit 120 and the screw heads are in contact with the top surface of the mounting unit 120, further advancement of the wing nuts 152 causes pressure to be applied to the top and bottom surfaces of the mounting unit 120. This pressure is advantageously suitable to securely retain the end connectors 138 as well as the input lines 135 from the subscriber's home or office. In this manner a firm conductive connection is established between the subscriber input lines 135 and the input terminal wire pair 132 of the RID 100, as shown in FIG. 1.

The mounting unit 120 is configured to include a pair of key-hole shaped openings, such as apertures 160, which have a wide, round base portion and a narrower, U-shaped neck portion. The apertures 160 are formed to receive a pair of threaded, conductive, surge posts 170 which serve as the telephone company connector terminals of the surge protector 110. The surge posts 170 extend from gradually upward tapering generally cylindrical portions 173 of the surge protector 110 which extend upward from the surge protector base. A pair of internally threaded fastening nuts 175 is engaged with each post 170. The fastening nuts 175 perform the function of securing the end connectors 136 of the wires 130 against the mounting unit 120 to maintain an electrical connection between the surge protector 110 and the RID 100. Additionally, the nuts 175 and posts 170 provide the mounting support for the mounting unit 120, as will be described in greater detail below.

The mounting unit 120 further includes a U-shaped opening or notch 180 which receives a threaded ground post 185. The ground post 185 is connected to a supporting base 188. The supporting base 188 includes mounting holes 190 and is configured to adjoin the side of the surge protector 110 as shown in FIG. 1. A ground connection terminal 195 extends from the surge protector 110 and is formed to receive and engage the ground post 185. The ground terminal 195 provides an electrical ground reference voltage as is well known in the art. A conductive connecting nut 196, which engages with the threaded ground post 185, may be tightened at the base of the ground post 185 so that a good conductive connection is established between the ground post 185 and the ground terminal 195. A securing or ground nut 198 also threadably engages with the ground post 185 and is used to apply pressure to the outer surface 122 of the mounting unit 120 so that the mounting unit 120 is held in place and is firmly attached to the surge protector 110. It should be noted that, although the ground post 185 and supporting base 188 are shown in FIGS. 1 and 2 as a separate element, the ground post 185 is often integrally formed with the surge protector 110.

In order to retrofit the RID 100 onto the surge protector 110, the RID 100 is first attached to the mounting unit 120 by means of the Velcro ® strips 140. It should be understood, however, that although such a selectively locking fastener has numerous advantages, a variety of attachment means may be contemplated by one of ordinary skill in the art, depending upon the particular application. For example, in one embodiment, the RID 100 is attached by means of epoxy or other suitable adhesive. The mounting unit 120 is then slipped over the surge posts 170 and the attached nuts 175 by passing the surge posts 170 and the nuts 175 through the broad portion of the key-hole apertures 160. Thus, the apertures 160 should be spaced apart by a distance approximately equal to the distance between the surge posts 170, and the broad portions of the key-hole apertures 160 should have a diameter slightly larger than the largest expected radius of the nuts 175. The narrow portions of the key-hole apertures 160 are sized and shaped to receive and snugly fit around the surge posts 170. Therefore, an installer is able to slip the mounting unit 120 over the first (i.e., the top) pair of nuts 175 and then slide the mounting unit horizontally so that the narrow portions of the key-hole apertures 160 engage with the surge posts 170 between the top pair of nuts 175 and the second or bottom pair of nuts 175. The top pair of nuts 175 can then be tightened on the top to secure the mounting unit 120 onto the surge protector 110 between the top and bottom pair of nuts.

Typically, the nuts 175 are already found on the surge protector terminal posts 170, and are permanently secured thereon by deforming the tops of the surge posts 170 so that a number of advantages are provided by the installation method and apparatus of the present invention. In particular, no additional materials (e.g., mounting nuts, brackets, drill holes, etc.) are necessary to install the RID 100. Further, the keyhole shaped apertures 160 provide considerable time savings during installation since the tops of the surge posts 170 would normally have to be hacked off with a fine saw in applications where it is necessary to completely remove the nuts 175. These savings in materials and installation time, even if they are relatively small for each installation, become substantial when considered in the perspective of several million installations.

As a further support, the notch 180 engages with the ground post 185 and the securing nut 198 is tightened so that the securing nut 198 applies pressure to the top surface of the mounting unit 120. Although not shown here, a second nut for applying pressure to the bottom surface of the mounting unit 120 may also be provided on the ground post 185. In order to insure that the notch 180 engages with the ground post 185, the spacing between the apertures 160 and the notch 180 should be approximately the same as the spacing between the surge posts 170 and the ground post 185.

Once the mounting unit 120 has been securely fastened to the surge protector 110 at the surge posts 170 and the ground post 185, the terminal wires 130, 132 are connected to their respective terminals. This is easily accomplished for the wires 130 by loosening the top nuts 175, slipping the connecting ends 136 under the nuts 175, and re-tightening the nuts 175. The top nuts 175 are advantageously conducting to insure a good, electrically-conductive connection between the wires 130 and the terminal surge posts 170. The terminal surge posts 170 are electrically connected to the surge protector circuitry, which in turn is connected to the telephone company circuitry, so that the RID 100 is in conductive communication with the telephone company circuitry via the surge posts 170. The wires 132 are equally easy to hook up. The wing nuts 152 are simply loosened a sufficient amount to allow the connecting ends 138 to slid under the heads of the screws 150. Incoming subscriber wiring may also be connected in the same way so that the pressure applied by tightening the wing nuts 152 causes a good, electrically-conductive connection to be established between the subscriber wiring and the terminal wires 132 of the RID 100. The ease of subscriber wire hook-up, and the separation of the subscriber input wires 135 from the telephone company wires 134 (FIG. 1) also produces other benefits. Notably, the subscriber is not required, and has no incentive, to touch the telephone company wires 134.

Once the retrofitting procedure has been performed as described above, the assembled product appears as shown in FIG. 1. The housing 125 may then be placed over the entire assembly to cover and protect the surge protector 110 and the RID interface apparatus 99. The entire retrofitting installation process described above may take a few minutes for a single-home surge protector device, thus affording considerable installation time savings over prior devices which may take up to an hour or more to install. Furthermore, the already existing housing may be retained when a mounting unit constructed in accordance with the present invention is employed. This provides a number of benefits including reduced expense since there is no need to provide a new, bulky housing, and the aesthetic value of having the entire RID 100 and mounting unit 120 hidden from view. Additionally, the old housing 125 may have been painted the same color as the house, which is usually not the case with new housings, thereby providing additional benefits of retaining the old housings. In addition, no new installation materials are necessary to retrofit the RID 100 onto the surge protector, and no mounting holes need to be drilled into the subscriber's home. Thus, the present invention provides an interface device for retrofitting a RID onto an existing surge protector in a simple, quick, and cost effective manner heretofore unknown in the prior art.

Figure 3:
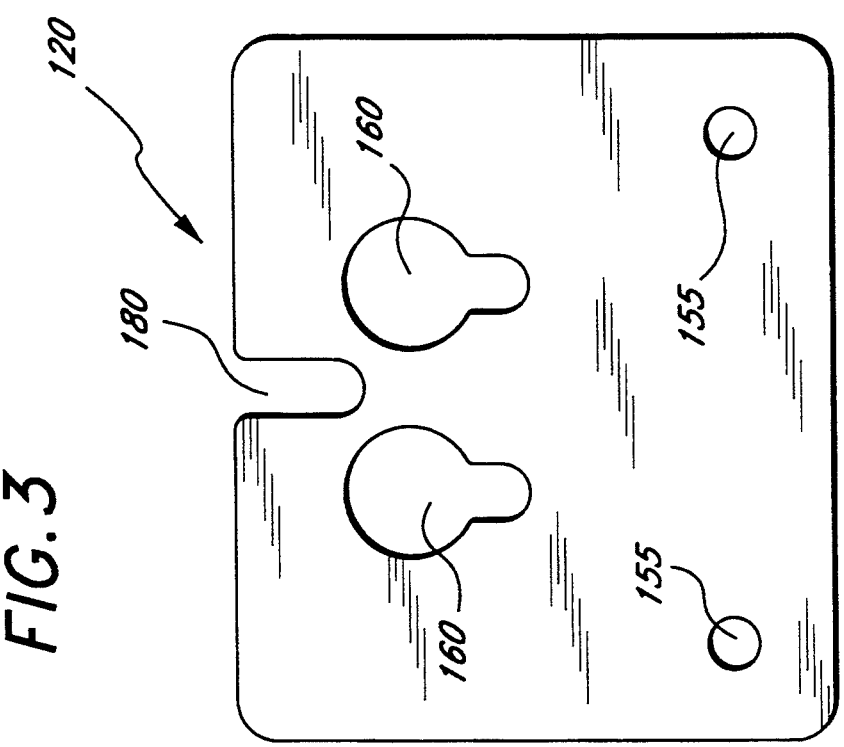
FIG. 3 is a plan view of a second embodiment of the retrofit interface apparatus of the present invention.

A plan view of the mounting unit 120 constructed in accordance with the present invention is shown in FIG. 3. The mounting unit 120 is advantageously rigid, non-conductive, and is constructed of a durable material able to withstand relatively wide temperature changes. In the embodiment shown, the mounting unit 120 is made from a material such as phenolic which is commonly used to manufacture printed circuit boards. It will be appreciated by one of ordinary skill in the art, however, that any suitable material may be used to manufacture the mounting unit 120 as called for by the specific application. The overall size of the mounting unit 120 may vary from application to application, and in one embodiment, the mounting unit is approximately 2 ¼" wide×2 ¾" long. The screw holes 155, the apertures 160, and the notch 180 may be formed by injection molding, drilling, or any suitable manufacturing technique. The relative spacing and sizes of the holes 155, the apertures 160, and the notch 180 are determined by the criteria set forth above, and it should be noted that the size, shape, and relative spacing of each of these openings, as well as the size and shape of the overall mounting unit 120 may be custom tailored to fit onto an existing surge protector while also fitting within the existing housing.

It should be noted that other variations of the invention may be contemplated without departing from its essence. For example, it is not essential that the mounting unit 120 engage with the ground terminal post 185. Thus, the mounting unit 120 could be cut off at the apertures 160 so that the apertures 160 are no longer key-hole in configuration, but rather consist of open U-notches similar to the notch 180. In addition, a number of different materials may be employed to construct the retrofit interface apparatus of the present invention so that the interface unit may be, for example, somewhat flexible.

Figure 4A:
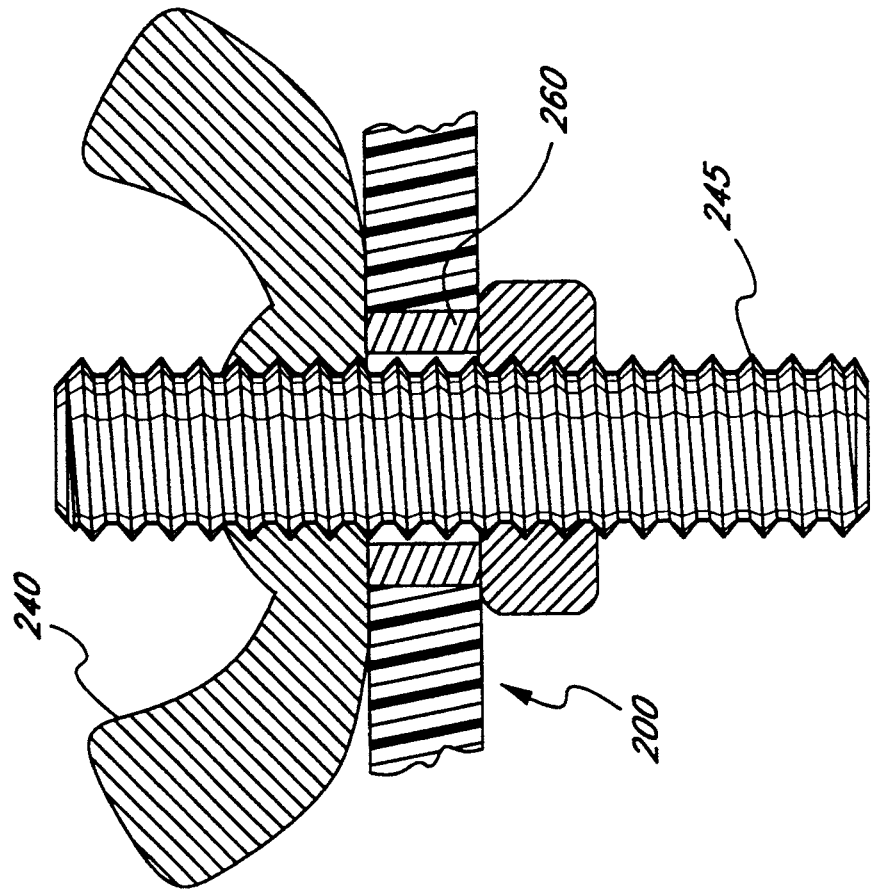
FIG. 4A is a cross-sectional view along a line 4a—4a of a wing nut terminal shown in FIG. 4.
Figure 4:
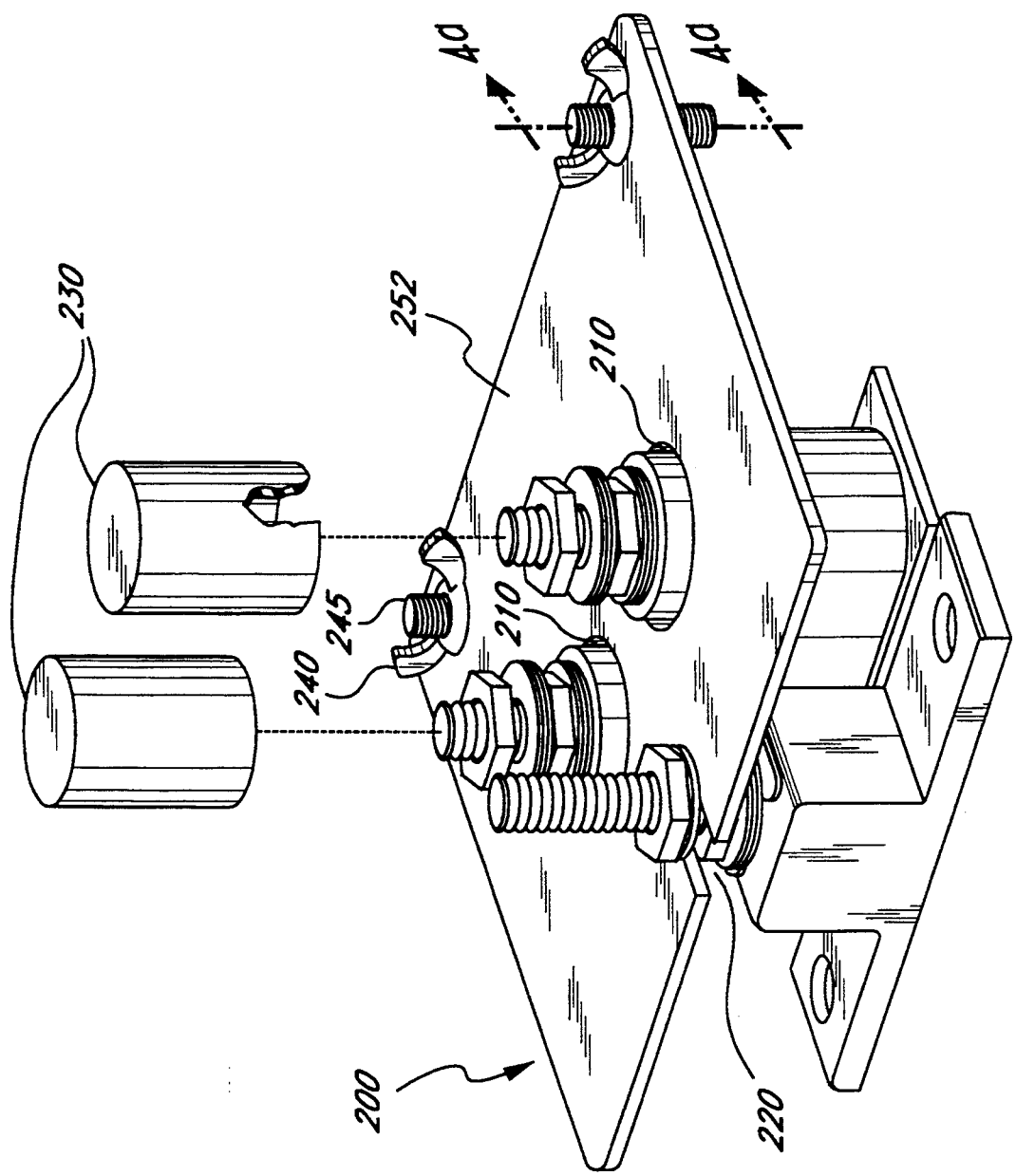
FIG. 4 is a perspective assembly view of a third embodiment of the present invention.

FIG. 4 is a perspective assembly view of an alternative RID and surge protector assembly wherein a modified mounting unit 200 is shown to provide an interface between the RID 100 and the surge protector 110. The mounting unit 200 has a similar size and configuration to the mounting unit 120, however, the mounting unit 200 includes apertures 210 which are generally round in shape and are larger than the apertures 160 in the mounting unit 120. This allows the mounting unit 200 to slip over the top of the surge posts 170, and the nuts 175, and onto the slightly frusto-conical, cylindrical portions 173. A notch 220 then engages with the ground post 185 at a position slightly lower than the position at which notch 180 of the mounting unit 120 engages with the ground post 185. The conductive portions of the surge posts 170 may be covered by means of non-conductive rubber caps 230 in order to provide safety.

The overall retrofit installation method using the mounting unit 200 is similar to that used with the mounting unit 120 with the exception that the apertures 210 do not directly engage with the conductive portions of the surge protector terminal posts 170. Instead, the mounting unit 200 slips over the top of the frusto-conical, cylindrical portions 173 and are prevented from sliding off of the cylindrical portions 173 by the engaging nut 198 on the ground post 185. Thus, the mounting unit 200 provides a reduced installation time over the mounting unit 120, but is not secured at as many points as the mounting unit 120 provides.

A second embodiment for connecting the terminal wires 132 of the RID 100 to the subscriber input wires is also shown in FIG. 4. In this embodiment, a pair of wing nuts 240 engage with a pair of threaded shafts 245 on an outer surface 252 of the mounting unit 200, and a pair of conventional hex nuts 250 (FIG. 4A) engage with the threaded shafts 245 on an inside surface of the mounting unit 200. This arrangement is shown in greater detail in the enlarged cross-sectional view of FIG. 4a. In FIG. 4a, the wing nut 240 and the hex nut 250 are clearly shown to engage with the shaft 245 on opposite sides of the mounting unit plate 200. The mounting unit 200 further includes a collar 260 which is formed within mounting unit 200 by means of a punch press or other suitable manufacturing methods. The collar 260 is made of a durable material such as brass, and enhances the durability of the mounting unit 200 at the junction where the connecting ends 138 meet the subscriber wires 135. In order to provide a good, electrically-conductive connection between the RID wires and the subscriber wires, the wing nuts 240 and the hex nuts 250 may be tightened to apply pressure to the connecting ends of the RID wires and the subscriber wires.

It will be appreciated by one skilled in the art that the subscriber wires 135 and the telephone company wires 134 may take on a variety of configurations, and originate from various locations, as called for by the specific application. Typically, however, the wires 134, 135 are elongated, flexible, conductive strands which may be braided to enhance durability and which may be covered with an insulating cover. The subscriber wires 135 typically exit from a subscriber's home through drill holes in the wall of the subscriber's home, and have loose connecting ends which may attach to the RID 100 via the wing nut terminals as described above. The telephone company wires 134 typically extend from a telephone pole and enter into the base of the surge protector 110 where they are conductively connected to the surge protector posts 170.

Figure 5:
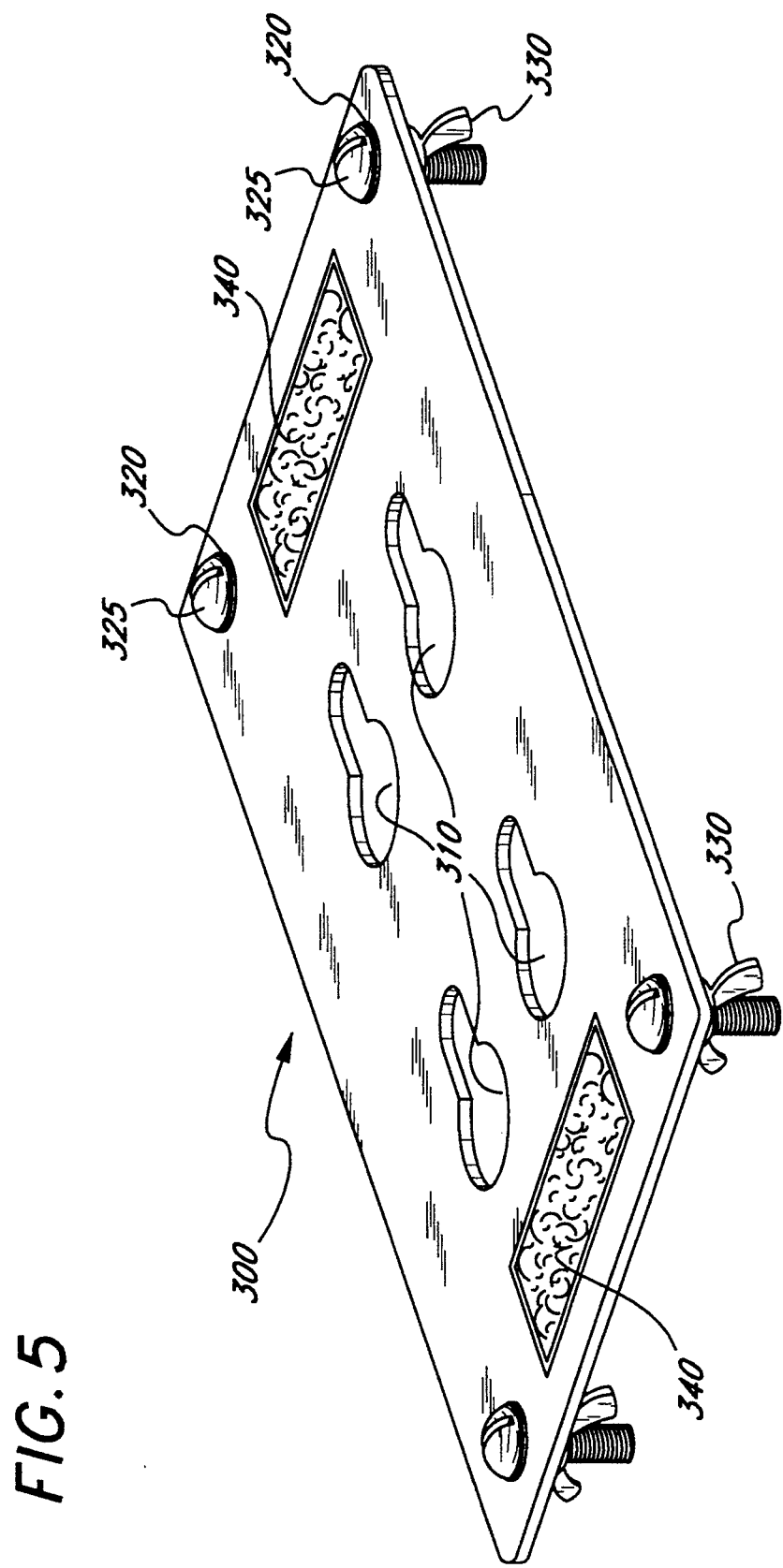
FIG. 5 is a perspective view of a fourth embodiment of a retrofit RID interface apparatus of the present invention for use with a dual-terminal pair surge protector device.

A perspective view of an alternative mounting unit 300 for use in an alternative embodiment of the RID retrofit interface apparatus is shown in FIG. 5. The mounting unit 300 is configured to provide an interface between two RIDs and a standard dual-terminal surge protector device (not shown). Four key-hole shaped apertures 310, which may engage with the conductive terminal posts of the dual-terminal surge protector, are formed within the mounting unit 300. Four holes 320 are also formed within the mounting unit 300. The holes 320 are sized to receive conducting terminal screws 325 which pass through the holes 320 and are engaged by wing nuts 330 on the bottom side of the mounting unit 300. The terminal screws 325 and the wing nuts 330 serve substantially the same purpose as the screws 150 and the wing nuts 152 in the embodiment shown in FIGS. 1 and 2 (i.e., to connect the subscriber wires to the RID terminal wires). A pair of Velcro ® strips 340 are also provided on the top surface of the mounting unit 300 for securing a pair of the RIDs 100 (not shown) onto the mounting unit 300. It should be understood that, although the Velcro ® strips 340 are shown to be separate strips which are both attached to the top surface of the mounting unit 300, one skilled in the art may choose to place one of the Velcro ® strips 340 on the top surface of the mounting unit 300 and the other Velcro ® strip 340 on the bottom surface of the mounting unit 300 in order to economize space, or other design concerns. In addition one large Velcro ® strip may be provided which may retain two RIDs at once.

The mounting unit 300 may be mounted in a manner similar to that employed to mount the mounting unit 120 in FIG. 1, with the exception that two pairs of conductive terminal posts are engaged within the apertures 310 rather than one pair of terminal posts. Also, since four attachment points are provided by the four terminal posts of the dual-terminal type surge protector, the mounting unit 300 typically does not include a notch for engaging the ground post of the dual-terminal surge protector devices.

Figure 6:
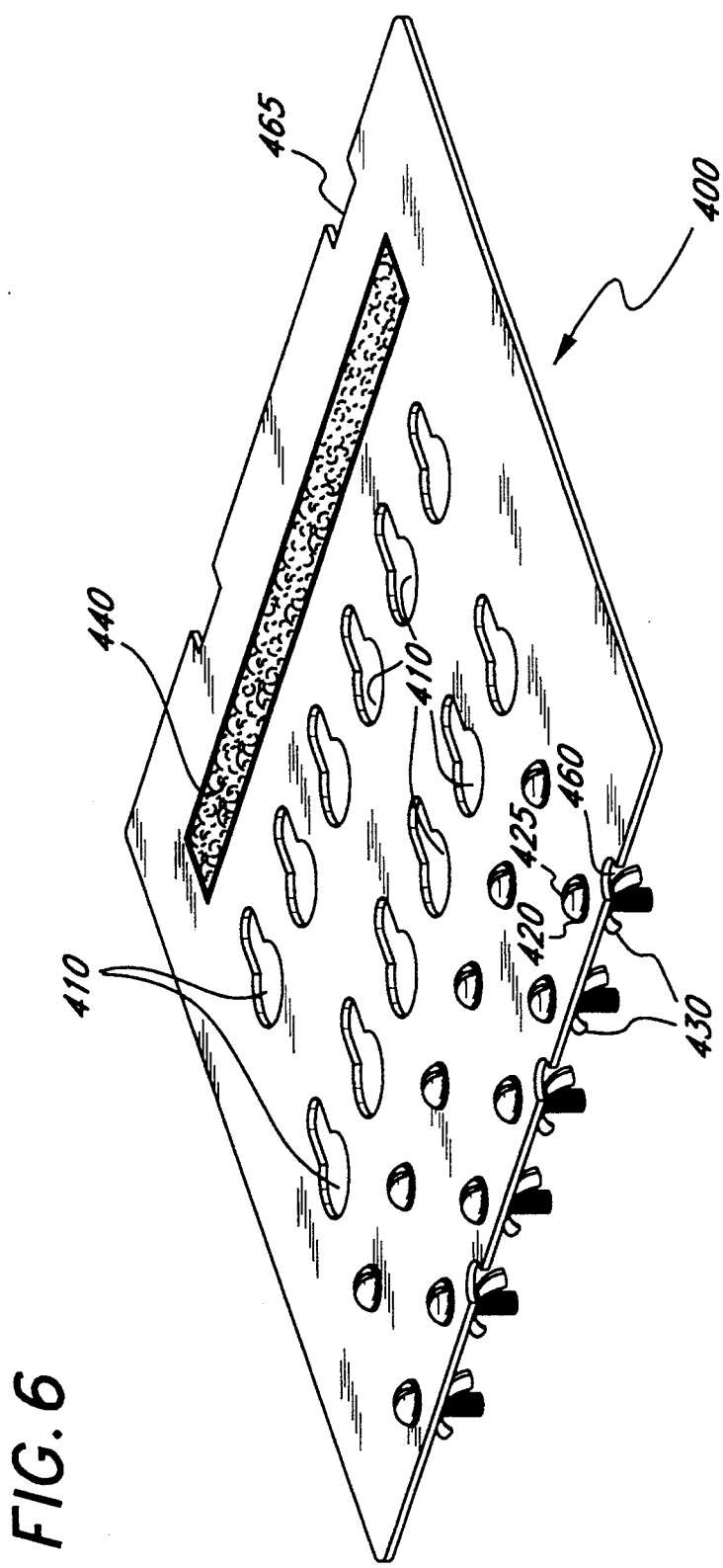
FIG. 6 is a perspective view of a fifth embodiment of the interface apparatus of the present invention for use with a multiple-terminal surge protector device.

Another embodiment of a mounting unit 400 used in accordance with the RID interface apparatus 99 of the present invention is shown in perspective in FIG. 6. The multiple terminal-pair mounting unit 400 comprises six pairs of receiving key-hole apertures 410. Although the embodiment of the mounting unit 400 shown in FIG. 6 incorporates six pairs of the apertures 410, it will be appreciated by one skilled in the art that this number is exemplary and corresponds to the actual number of surge protector terminal pairs provided in one actual multiple terminal-pair surge protector device. For example, the embodiment shown in FIG. 6 is configured to provide a retrofit interface for a multiple terminal-pair over-voltage protector manufactured by TII, Model No. 536-6L. Thus, it will be understood that the number, configuration, and relative spacing of the apertures 410 may vary depending upon the designated surge protector device and the desired application. However, it will also be appreciated that the large majority (approximately 95%) of surge protector devices mounted on residences come in standard sizes of 2, 4, 6, or 12 terminal posts so that installer's typically have to keep only a few different types of the mounting units in inventory in order to retrofit RIDs on substantially any home or building. Further, since the major cost in retrofitting homes by means of the retrofit interface apparatus 99 of the present invention is the RID 100, there is not usually a problem with stockpiling various types of mounting units. This is because, in most embodiments of the invention, the RID 100 is interchangeable and may be affixed to any one of the mounting units described above by means of the Velcro strips. Thus, the high cost part of the RID interface apparatus 99 is not lost if an excess supply of one type of mounting unit occurs.

In the embodiment of the mounting unit 400 shown in FIG. 6, each pair of apertures 410 is proximate to a pair of terminal screws 425. The terminal screws 420 pass through holes 420 formed within the mounting unit 400, and are engaged by wing nuts 430 on the opposite side of the mounting unit 400. The terminal screws 425 and the wing nuts 430 perform essentially the same function as the terminal screws 150, 325 and the wing nuts 152, 330 respectively. A long strip of Velcro ® 440 extends along the length of the mounting unit 400 adjacent the apertures 410. The Velcro ® 440 is preferably long enough to accommodate six RIDs.

The mounting unit 400 further includes a series of semicircular grooves 460 and square notches 465 formed on the edges of the mounting unit 400. The grooves 460 and the notches 465 are sized and spaced to accommodate ribbing on the inside of the 536-6L Model housing. This allows the mounting unit 400 to fit neatly over the surge protectors in the housing without interference from the ribbing inside the housing. In one actual embodiment, the mounting unit 400 is approximately 9" long and 4 ½" wide, with the ½" wide notches 465 formed 2 ⅜" in from either side, and the ½" diameter semicircular grooves 460 formed at 2", 4½", and 7" from either corner of the mounting unit 400.

Figure 7:
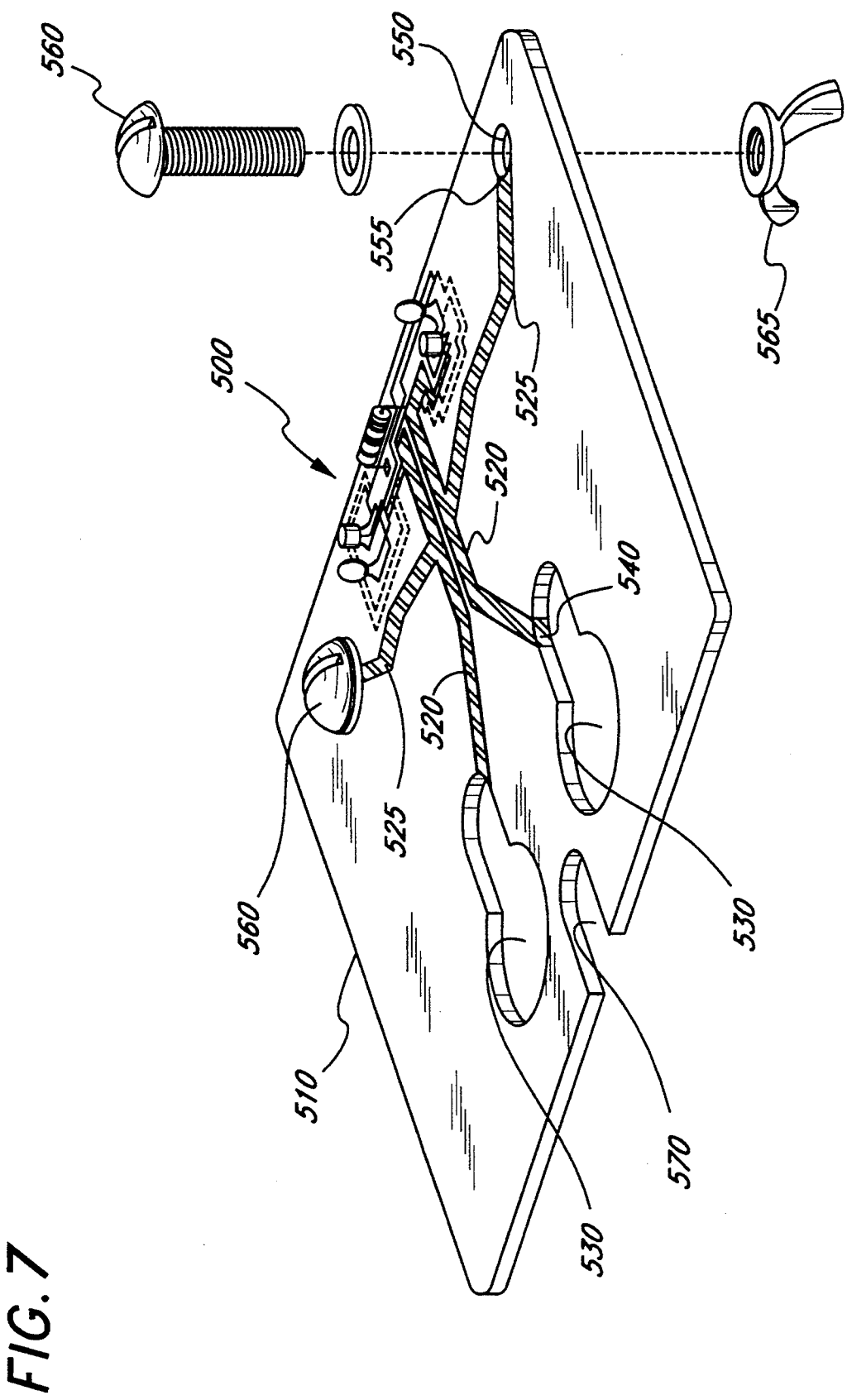
FIG. 7 is a perspective view of a sixth embodiment of the present invention wherein the RID circuitry is embedded into the interface unit.

In yet another embodiment of the present invention, shown in FIG. 7, RID circuitry 500 is incorporated into the structure of a mounting unit 510 much in the same way that circuitry is connected on conventional printed circuit boards. The RID circuitry 500 may also be an integrated circuit, or other circuitry suitable for layered circuit board connection. Although this embodiment of the invention requires a higher initial investment, such an embodiment is more compact and may actually lower total costs at a very high production volume. It should be noted, however, that the standard design of the RID interface apparatus 99, wherein the RID 100 is detachable, offers several significant advantages. For example, the mounting units will not become obsolete even if there are advancements in RID technology. Likewise, since the mounting unit is able to secure RIDs of various shapes and sizes, the phone company is also able to take advantage of changes in shapes or suppliers when to do so would result in cost savings. Thus, each of the embodiments of the invention offer distinct advantages.

As shown in FIG. 7, the circuitry 500 is connected to electrically conductive traces 520, 525 formed on, or slightly beneath, the surface of the mounting unit 510. The traces 520, 525 may be manufactured by means of conventional circuit board manufacturing techniques, although one skilled in the art will appreciate that a number of production methods may be utilized to form the traces 520, 525. The traces 520 extend from the circuitry 510 to apertures 530 where the traces 520 terminate in electrically conductive faces 540 in the side of the apertures 530. The electrically conductive faces 540 of the traces 520 are positioned so as to form a conductive contact with conductive posts of the surge protector device (e.g., the conductive surge posts 170 shown in FIGS. 1 and 2). If the traces 520 are formed so that they are exposed on the surface of the mounting unit 510, then nuts used to fasten the mounting unit 510 onto the surge protector (e.g., the nuts 175 shown in FIGS. 1 and 2) may be made of conductive material to further enhance the electrically conductive contact between the conductive posts and the traces 520.

The traces 525 extend from the circuitry 500 to terminal screw holes 550 where the traces 525 terminate in electrically conductive faces 555 in the side of the terminal screw holes 550. The electrically conductive faces 555 of the traces 525 are positioned so as to form a conductive contact with terminal screw 560. The terminal screws 560 are fastened tightly to the mounting unit 510 by means of a pair of wing nuts 565. The terminal screws 560 and the wing nuts 565 are configured in substantially the same way and perform substantially the same function as the terminal screws 150 and wing nuts 152 of FIGS. 1 and 2. In one embodiment, the traces 525 may be exposed on the surface of the mounting unit 510 proximate to the holes 555 so that electrically conductive portions of the attached subscriber wires (not shown) form a conductive contact with the exposed portions of the traces 525 when the subscriber wires are secured by the terminal screws 560.

The overall form of the mounting unit 510 shown in FIG. 7 is substantially the same as the configuration of the mounting unit 120 shown in FIGS. 1 and 2. Thus, the size, shape, and relative spacing of the apertures 530, and the screw holes 550 is substantially the same as the apertures 160 and holes 155 in FIGS. 1 and 2. A notch 570 is also provided in the side of the mounting unit 510. The configuration and spacing of the notch 570 is substantially the same as the configuration and spacing of the notch 180 of FIGS. 1 and 2. Although the embodiment of the invention wherein RID circuitry 500 is embedded into the mounting unit 510 is shown in FIG. 7 to have substantially the same configuration as the mounting unit 120 of FIGS. 1 and 2, it should be understood that RID circuitry may be embedded in any one of the embodiments of the invention described herein. Furthermore, it should be noted that RID circuitry may be embedded in any of the variations of the retrofit RID interface contemplated by one of ordinary skill in the art, assuming suitable applications for this aspect of the invention.

In another embodiment of the invention, mounting brackets are provided to aid RID/surge protector interfacing in applications where it is desirable to maintain an exceptionally low profile. For example, some surge protector housings may include little or no space above the tops of the conducting posts. Thus, it is desirable to provide a means for connecting the mounting unit to the surge protector without requiring the use of additional vertical space above the surge protector. The interface brackets of the present invention allow the mounting units and RIDs to be laterally displaced from the surge protector so that effectively no additional vertical space is taken up within the housing by the mounting unit and RID.

Figure 8:
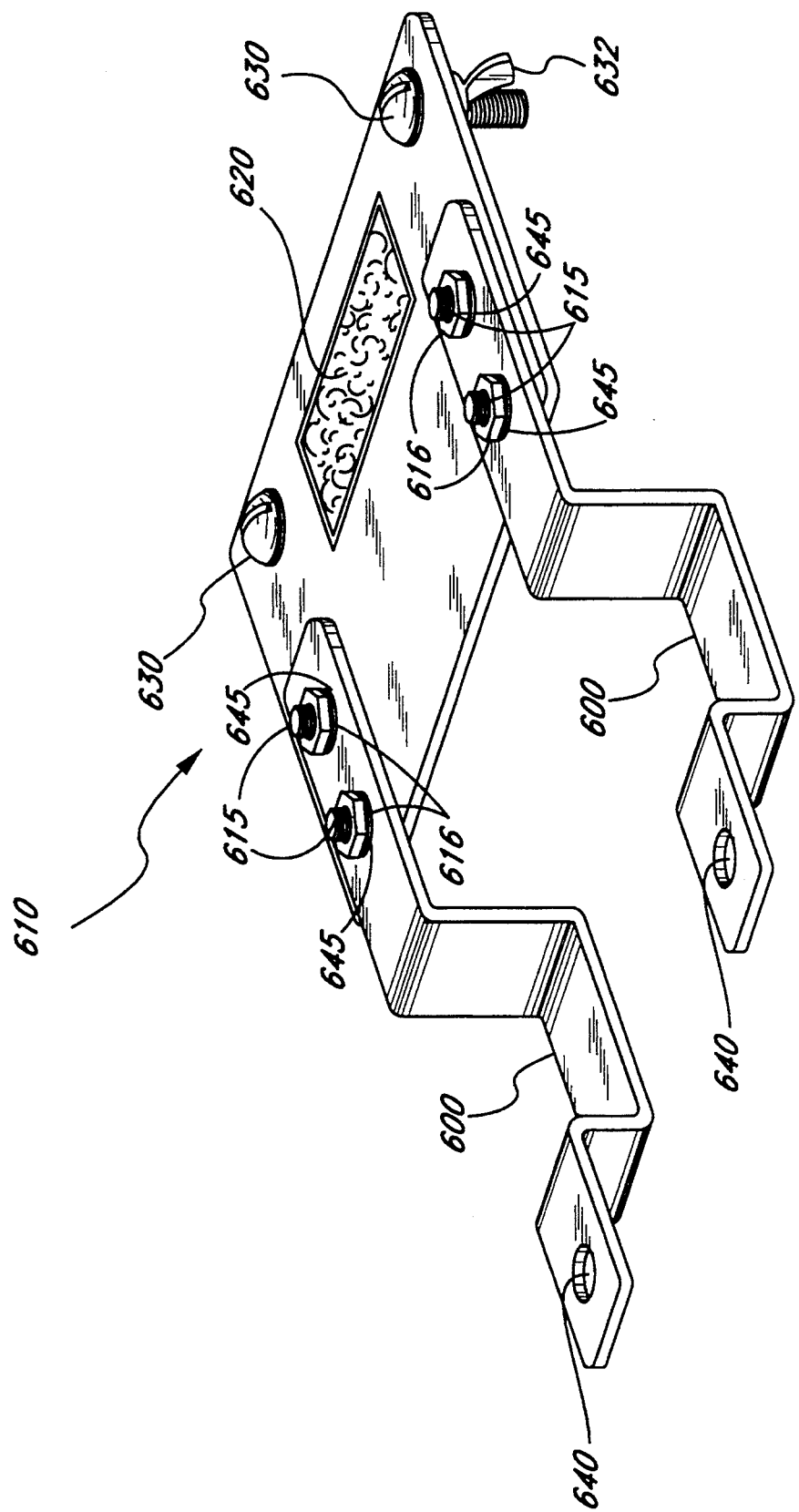
FIG. 8 is a perspective view of a seventh embodiment of the interface apparatus of the present invention wherein mounting brackets are used in conjunction with a mounting unit as an intermediate interface between a surge protector and a RID.

FIG. 8 shows one embodiment of the present invention wherein a pair of intermediate mounting brackets 600 are attached to a mounting unit 610. The brackets 600 are connected to the mounting unit 610 by means of screws 615 and hex nuts 616 or other suitable connecting means. The mounting unit includes a Velcro ® strip 620 as well as a pair of terminal screws 630 which pass through holes (not shown) in the mounting unit 610 to engage with corresponding wing nuts 632. The brackets 600 comprise a pair of generally flat strips each having connection holes 640, 645 on both ends. The connection holes 640 are for connection with the surge protector terminals, while the connection holes 645 are for connection with the mounting unit 610 by means of the screws 615 and hex nuts 616. The brackets 600 are preferably made from a malleable, conducting material such as copper, or the like. In one advantageous embodiment, the brackets 600 comprise flat strips which are bent into a desired shape. The shape of the brackets 600 is typically determined by the configuration of the surge protector which attaches to the brackets 600 and the configuration of the surge protector housing. In practice, the brackets 600 should be shaped to allow the holes 640 to engage with the conducting posts of the surge protector device, and to horizontally displace the mounting unit 610 (with an attached RID) so that the mounting unit 610 fits within a space provided beneath the surge protector housing. Thus, the various dimensions and shapes of the intermediate mounting brackets 600 may vary from application to application.

Figure 9:
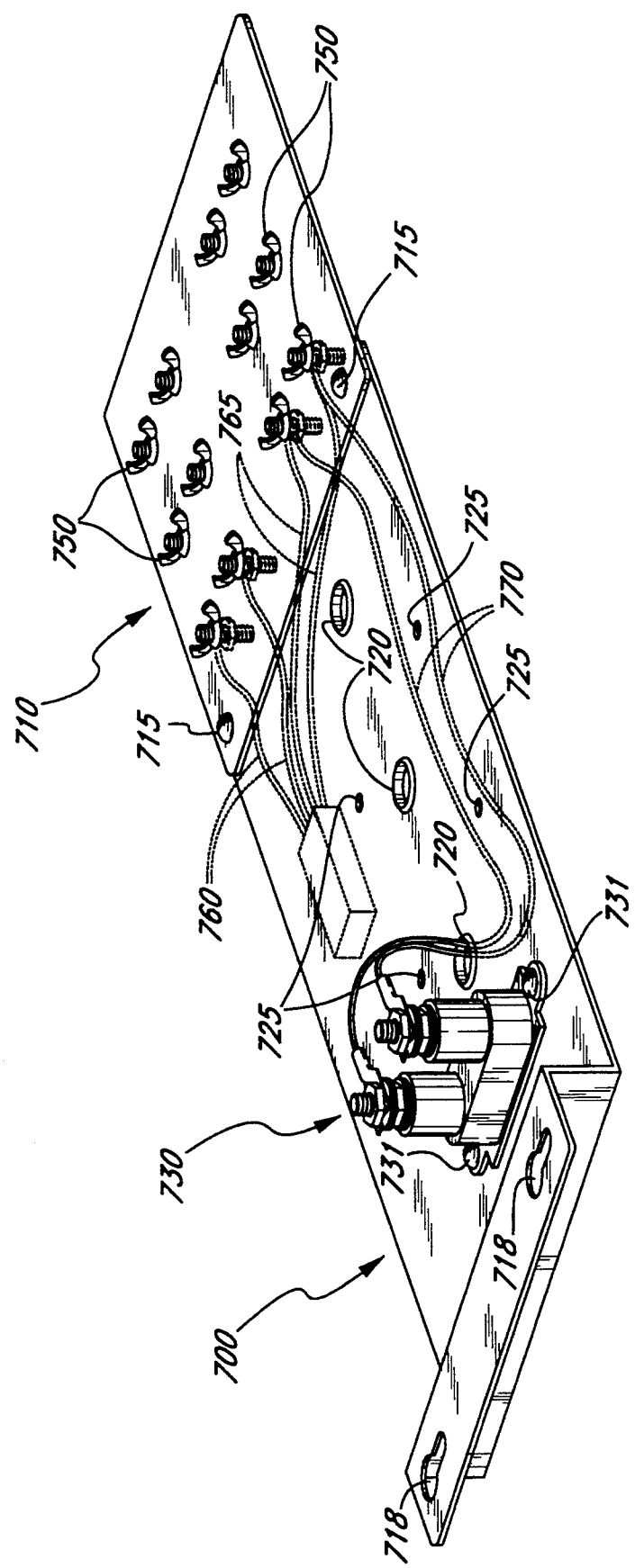
FIG. 9 is a perspective view of a eighth embodiment of the interface apparatus of the present invention wherein a multiple terminal mounting bracket provides a mounting surface for surge protectors and RIDs.

FIG. 9 shows an intermediate bracket 700 for use with certain multiple terminal systems. Under one aspect of the invention, the intermediate bracket 700 provides a mounting surface for one or more surge protector devices, as well as their corresponding RIDs, under a vacant housing cover. In In a significant number of homes and structures, vacant housings have been constructed with the intention of mounting surge protector devices within these housings at a later date. However, in a large number of these vacant housings, little or no provision is made for mounting multiple surge protector devices. Even more so there is no provision in such housings for mounting RIDs. The intermediate mounting bracket 700 provides a solution to these difficulties by furnishing a mounting surface to which both surge protectors and RIDs may be mounted. Furthermore, the intermediate mounting bracket 700 is configured to attach to a mounting unit 710 so that electrical connections may be established between the RIDs and the surge protectors.

In FIG. 9, the intermediate mounting bracket 700 is shown to be attached to the mounting unit 710 by means of connecting screws 715. A pair of installation apertures 718 are formed at one end of the bracket 700 so that the bracket 700 may be affixed to a wall stud, or the like, within the vacant housing. A plurality of large and small mounting holes 720, 725 are provided for mounting a surge protector device 730 onto the mounting bracket 700. The embodiment of the bracket 700 shown in FIG. 9 is configured to mount six surge protectors 730, wherein each surge protector device 730 is mounted onto the bracket 700 by means of two of the small holes 725. Wiring for each of the surge protectors 730 may then be passed through the large holes 720. The surge protectors 730 may be mounted onto the bracket 700 by a variety of different connecting members, such as mounting screws 731 in one embodiment. An RID 740 (shown in phantom) may be mounted onto the underside of the bracket 700 by means of adhesive, Velcro ® or other suitable attachment means.

The mounting unit 710 includes a plurality of wing nut connecting terminals 750 which may, in one embodiment, be configured in substantially the same way, and perform substantially the same function, as the wing nuts 240 together with the threaded shafts 245 and hex nuts 250 shown in FIGS. 4 and 4A. Two pairs of wing nut terminals 750 are provided for each surge protector/RID combination. For each RID 740, one pair of wing nut terminals 750 secures and electrically connects incoming lines from the subscriber's circuitry to wires 760 of the RID 740, while the other wing nut terminal pair 750 provides an electrical connection between wires 765 of the RID 740 and wires 770 which extend from the conducting posts of the surge protector device 730. In this manner, the RID 740 is placed in series connection between the subscriber's wiring and the telephone company wiring via the surge protector 730.

Figure 10:
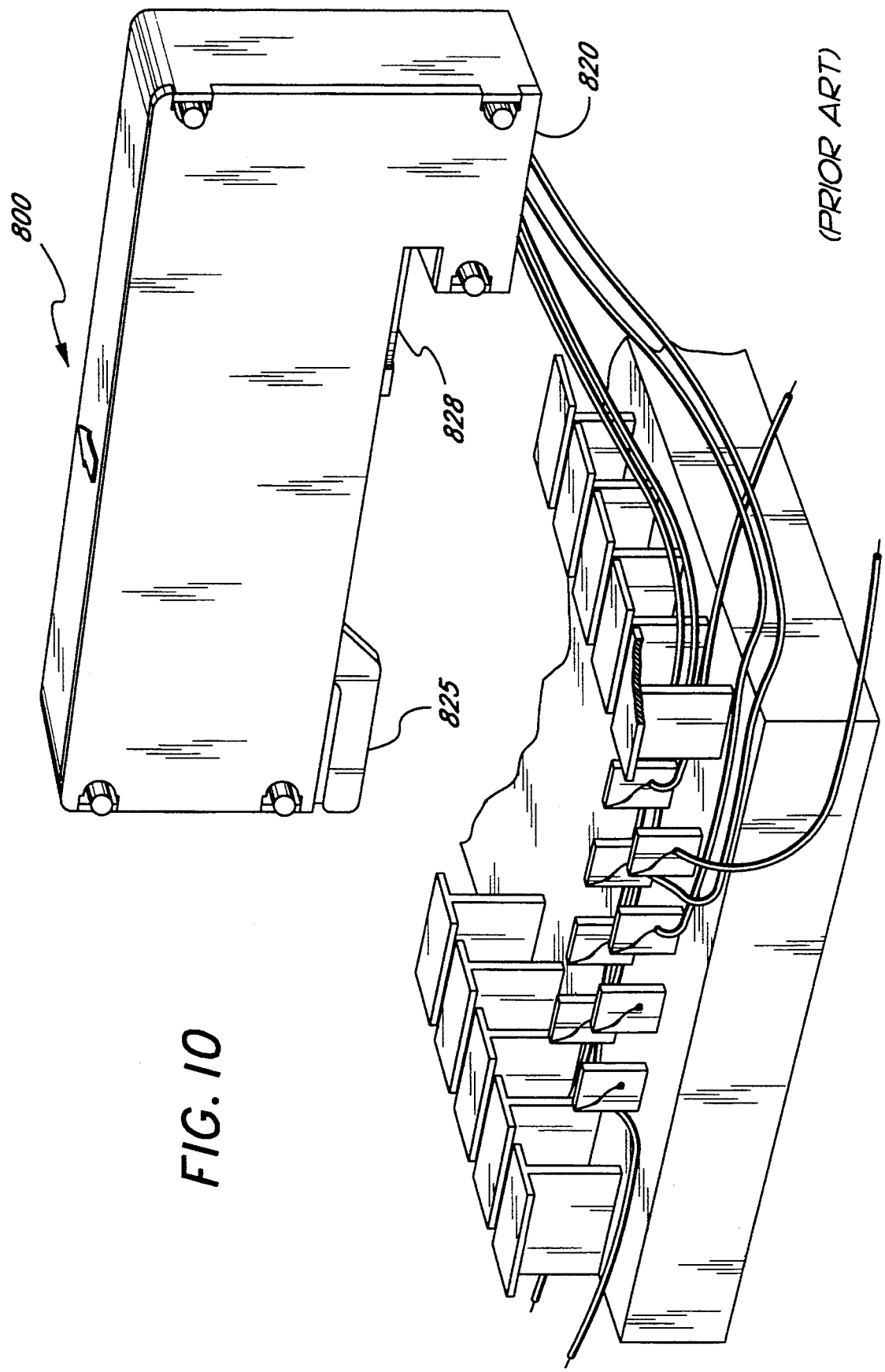
FIG. 10 is a perspective view illustrating a prior RID retrofit clip used to mount a RID onto a conventional 66 block surge protector.
Figure 11:
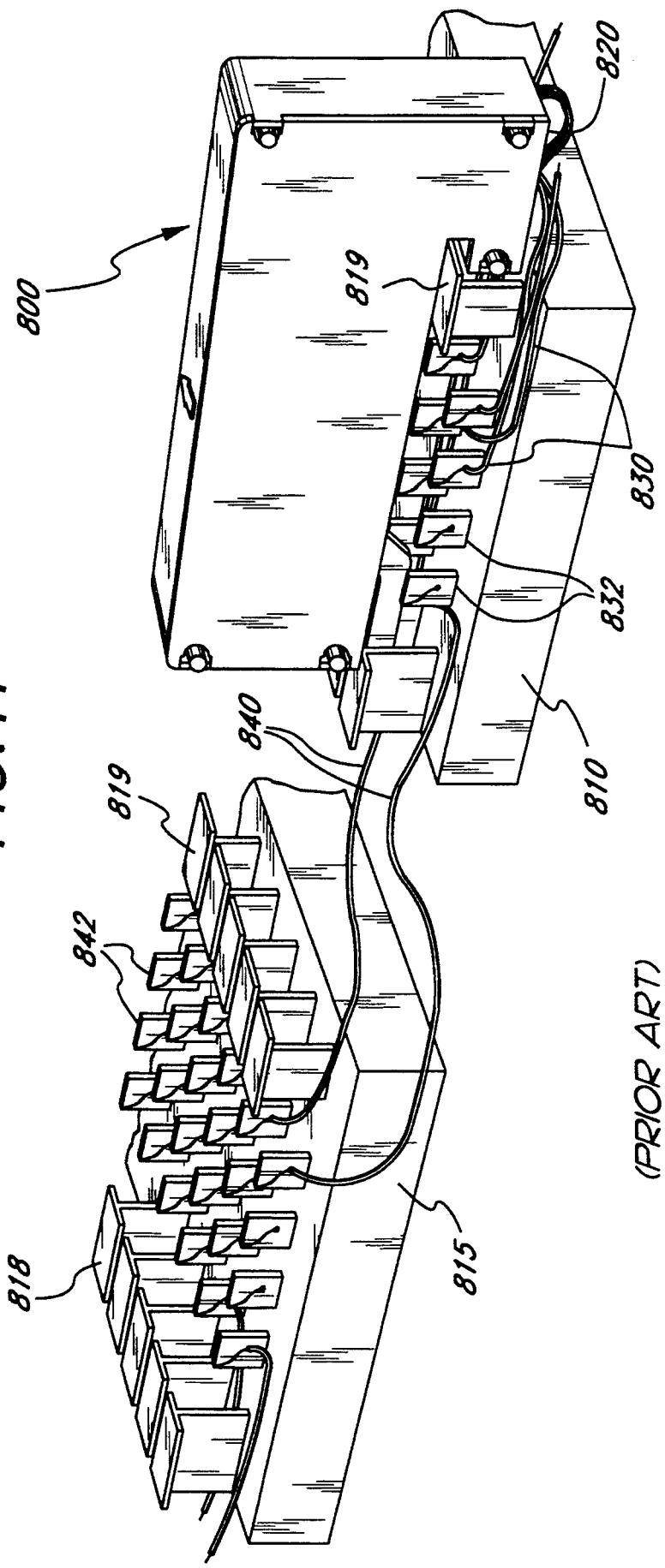
FIG. 11 is a perspective view of the prior retrofit clip of FIG. 10 as mounted onto a 66 block surge protector.

In a further aspect of the present invention, a terminal connector is provided as a means for connecting an RID between industrial surge protectors such as a pair of conventional 66 blocks. FIG. 10 shows a perspective view of a prior retrofit device, such as a retrofit device disclosed in U.S. Pat. No. 4,764,950. FIG. 11 shows the prior retrofit device as used for mounting a RID onto a conventional 66 block surge protector. The retrofit device includes a housing 800 which encapsulates a RID. The 66 block (FIG. 11) comprises a subscriber column 810 and a telephone company column 815, each having left and right side tabs 818, 819. The housing 800 includes a protrusion 820 that fits beneath the tabs 818, 819 of the subscriber column 810 (or the telephone company column 815 if desired) as shown in FIG. 11. The housing 800 further includes securing ribs 825, 828 which engage with the tabs 818, 819 respectively to secure the housing to the column 810. RID leads 830 extend from the housing 800 and connect to conductive subscriber terminals 832 on the subscriber column 810. Subscriber leads 833 connect to terminals on the subscriber column and continue into the subscriber's office. RID leads 840 also extend from the housing 800 and connect to telephone company terminals 842 on the telephone company column 815. Telephone company leads 843 connect to terminals on the telephone company column 815 and continue to the telephone company office. Each horizontal row of terminals on the subscriber and telephone company columns 810, 815 are in conductive connection and therefore constitute a single electrical point. Thus, the RID within the housing 800 is placed in series connection between the subscriber terminals 832 and the telephone company terminals 842.

Because each subscriber pair requires its own RID, this method of mounting RIDs proves very cumbersome. This is because the housing 800 extends over the face of the connecting block 810 so that the terminals are covered. Therefore, when it is required to service the multiple subscriber terminals, the RIDs which cover each terminal pair often become an obstruction which results in increased labor costs each time one of the multiple subscriber surge protectors is serviced. In fact, subscriber's may even be reluctant to have such RID retrofit devices installed due to the increased labor costs which may be incurred as a result.

Figure 12:
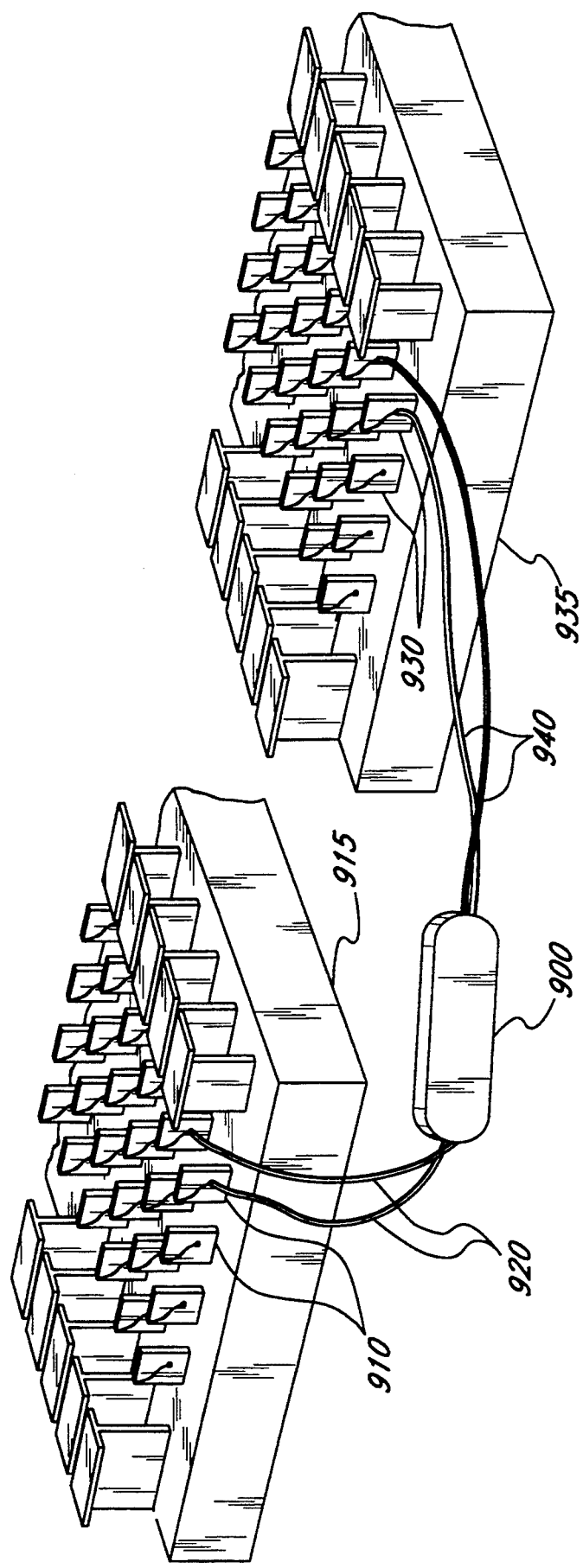
FIG. 12 is a perspective view which shows an RID connected between the terminals of a 66 block in another aspect of the present invention.

A terminal connector 901, shown in the perspective view of FIG. 12, overcomes the difficulties associated with prior retrofit apparatuses. The terminal connector 901 comprises a RID 900 which connects to a pair of telephone company terminals 910 on a telephone company surge protector column 915 via leads 920. The RID 900 further connects to a pair of subscriber terminals 930 on a subscriber surge protector column 935 via leads 940. The leads 920 extend from one end of the RID 900, while the leads 940 extend from the opposite end of the RID 900. In one advantageous embodiment, the RID 900 also has a slim profile so that the body of the RID 900 is approximately the same width as the distance between the leads 920 and the distance between the leads 940. In this manner, the RID 900 is quickly and easily connected between the subscriber terminals 930 and the telephone company terminals 910. The configuration of the RID 900 and the manner in which the RID 900 is connected between the terminals 910, 930 provides several advantages over the prior device shown in FIG. 10. Most notably, the RID 900 does not obstruct any of the subscriber or telephone company terminals because the RID 900 simply fits within the normal jumper path between the subscriber terminals and the telephone company terminals. Furthermore, the RID 900 does not need any supporting clip, since the RID 900 can be supported entirely by the wires 920, 940. Because the wires 920, 940 extend from opposite sides of the RID 900 ability of the wires 920, 940 to support the RID 900 is significantly enhanced. This is because the extension of the wires 920, 940 from opposite sides of the RID reduces stress on the wires 920, 940. In addition, because of the slim profile of the RID 900, the RID 900 and the leads 920, 940 may simply be treated as a pair of Dumper leads which extend from the subscriber column 935 to the telephone company column 915. Thus, this embodiment of the present invention offers several advantages over prior retrofit devices.

Figure 13:
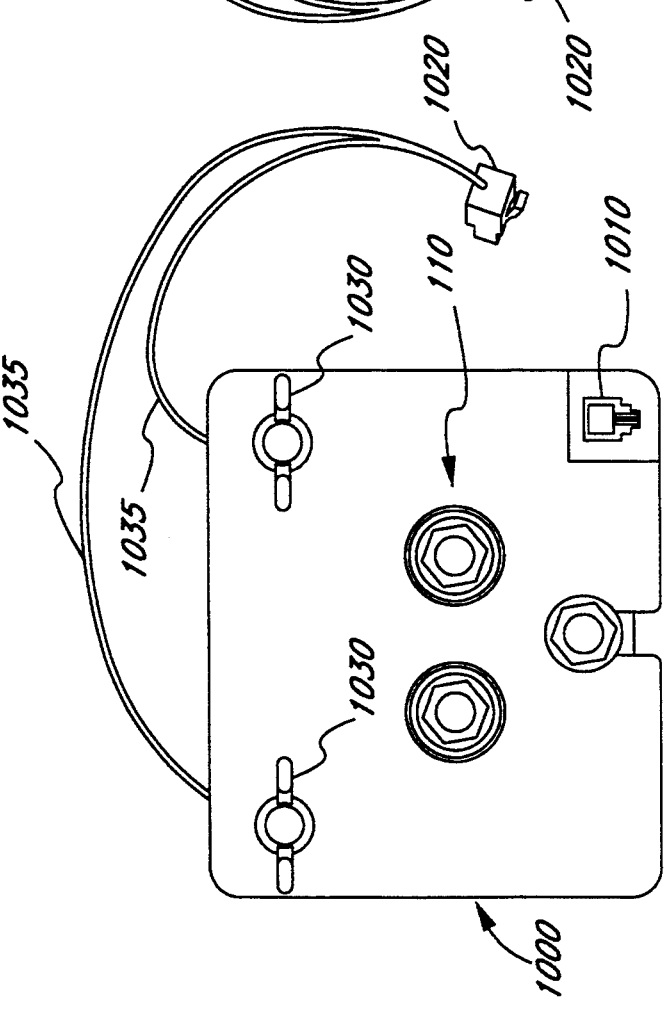

An additional embodiment of the present invention is described in detail with reference to FIGS. 13 and 14. FIG. 13 is a frontal plan view showing a mounting unit 1000, constructed in accordance with one aspect of the present invention, connected to the surge protector 110. The mounting unit 1000 is similar in size and shape to the mounting unit 200 (FIG. 4) with the exception that a female telephone jack connection 1010 is formed in the bottom corner of the mounting unit 1000. The female telephone jack 1010 is configured to receive conventional male telephone jack connectors. Because the configuration of the mounting unit 1000 is similar to the configuration of the mounting unit 200, the mounting unit 1000 can be secured to the surge protector 110 in the same manner that the mounting unit 200 is connected to the surge protector 120 as described with reference to FIG. 4.

Figure 14:
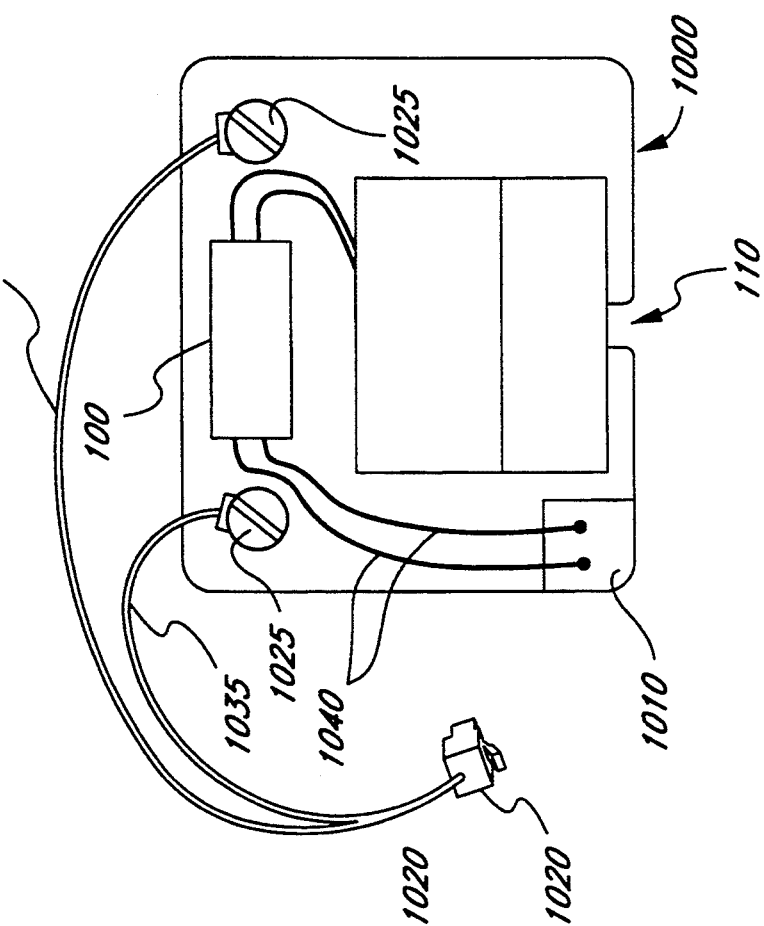
FIGS. 13 and 14 are front and rear plan views respectively of an additional embodiment of the present invention wherein a telephone jack connector is formed within the mounting unit body.

FIG. 14 is a rear plan view of the mounting unit 1000 as connected to the surge protector 110. The RID 100 is also mounted onto the back surface of the mounting unit 1000. A male telephone jack connector 1020 connects to conductive screw terminals 1025 by means of leads 1035. The screw terminals 1025 are held securely by means of wing nuts 1030 (FIG. 13) which are tightened on the opposite side of the mounting unit 1000.

The female telephone jack connector 1010 connects to the subscriber side of the RID 100 via a pair of conductive leads 1040, while the telephone company side of the RID 100 connects to the surge protector 110. The female telephone jack connector 1010 is configured to receive the male connector 1020 so that a continuous electrical connection is established between the subscriber side of the RID 100 and the terminal screws 1025 through the connection of the male and female jack connectors 1020, 1010.

The purpose of providing a connection between the subscriber side of the RID 100 and the terminal screws 1025 in this manner is to allow a subscriber to test the incoming signals from the telephone company at the subscriber/phone company interface. To test the incoming telephone company signals, the subscriber need only remove the male jack 1020 and plug in a conventional telephone into the female jack 1010. If the subscriber hears a normal dial tone, then this indicates that the telephone company wiring is functional.

The present invention may be embodied in other specific forms without departing from its spirit or essential characteristics. Furthermore, a series of different configurations other than those depicted and described herein may also be contemplated by one of ordinary skill in the art as obvious modifications of the present invention. Thus, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A retrofit interface apparatus for use in connecting a remote isolation device to a previously installed surge protector device including a pair of surge posts and a ground post within a housing covering said surge posts and said ground post, said apparatus comprising:
    a remote isolation device; and
    a mounting unit, comprising:
        a body defining an inner surface and an outer surface, said inner surface of said body defining a supporting surface to which said remote isolation device is secured;
        a receiving element for receiving at least one of said posts; and
        a pair of terminals on said outer surface of said body adapted to be connected to a pair of subscriber wires, said pair of terminals electrically connected through said body to said remote isolation device secured to said inner surface of said body, wherein said outer surface of said body shields said remote isolation device from subscriber contact,
    and wherein said retrofit interface apparatus is sized and shaped to fit within said housing of said previously installed surge protector device.

2. A retrofit interface apparatus of claim 1, wherein said receiving element comprises a pair of openings.

3. The retrofit interface apparatus of claim 2, wherein each of said pair of openings is sufficiently large that it is capable of receiving portion of a cylindrical portion of a base from which a surge protector post extends.

4. The retrofit interface apparatus of claim 2, further comprising a non-conductive cap positioned over each of said surge protector posts.

5. The retrofit interface of claim 1, further comprising a fastener portion secured to said supporting surface, wherein said fastener portion selectively secures and releases said remote isolation device from said body.

6. The retrofit interface apparatus of claim 5, wherein said fastener portion comprises half of a hook and loop fastener permanently affixed to said body, said fastener portion cooperating with a mating hook and loop fastener permanently affixed to said remote isolation device.

7. The retrofit interface apparatus of claim 1, further comprising a second remote isolation device and a second supporting surface to which said second remote isolation device to said body is secured.

8. The retrofit interface apparatus of claim 1, wherein said receiving element comprises an opening.

9. The retrofit interface apparatus of claim 8, wherein said previously installed surge protector device further includes a nut secured to said at least one of said posts and said nut secures said retrofit interface apparatus to said device.

10. A method of mounting a remote isolation device on a building upon which has previously been mounted a surge protector device and housing therefor, said surge protector having a pair of surge protector posts, a pair of surge protector nuts threaded over said surge protector posts, a ground post and a ground post nut threaded over said ground post, said method comprising:
    mounting said remote isolation device on a mounting unit, comprising:
        a body defining an inner surface and an outer surface, said inner surface of said body defining a supporting surface to which said remote isolation device is secured;
        a receiving element for receiving at least one of said posts; and
        a pair of terminals on said outer surface of said body adapted to be connected to a pair of subscriber wires, said pair of terminals electrically connected through said body to said remote isolation device secured to said inner surface of said body, wherein said outer surface of said body shields said remote isolation device from subscriber contact,
    and wherein said mounting unit is sized and shaped to fit within said existing housing;
    removing said housing from said surge protector;
    inserting said mounting unit over said surge protector device so that said receiving element receives at least one of said posts;
    securing said mounting unit to said surge protector device by tightening said nut threaded over said at least one of said posts against said body; and,
    securing said housing over surge protector, said remote isolation device and said mounting unit.

11. The method of claim 10, wherein said remote isolation device includes a pair of subscriber leads, further comprising the step of positioning said subscriber leads between said surge post nuts and said body to form an electrical connection between said surge posts and said remote isolation device.

12. The method of claim 11, further comprising securing a pair of subscriber wires electrically connected to a subscriber telephone to said pair of terminals.

13. A mounting unit for use in connecting a remote isolation device to a previously installed surge protector device including a pair of surge posts and a ground post within a housing covering said surge posts and said ground post, said apparatus comprising:
    a body defining an inner surface and an outer surface, said inner surface of said body defining a supporting surface to which a remote isolation device is securable;
    a receiving element for receiving at least one of said posts; and
    a pair of terminals on said outer surface of said body adapted to be connected to a pair of subscriber wires, said pair of terminals electrically connected through said body to said to said inner surface of said body proximate said supporting surface, wherein said outer surface of said body is capable of shielding a remote isolation device secured to said supporting surface from subscriber contact,
    and wherein said mounting unit is sized and shaped to fit within said housing of said previously installed surge protector device.

14. The mounting unit of claim 13, wherein said receiving element comprises an opening.

15. The mounting unit of claim 14, wherein said previously installed surge protector device further includes a nut secured to said at least one of said posts and said nut secures said mounting unit to said device.

16. A mounting unit for use in connecting a pair of remote isolation devices to a previously installed surge protector device including two pair of surge posts and two ground posts within a housing covering said surge posts and said ground posts, said apparatus comprising:
- a body defining an inner surface and an outer surface, said inner surface of said body defining a pair of supporting surfaces to which a pair of remote isolation devices is securable;
- a pair of receiving elements, each of said receiving elements adapted to receive at least one of said posts; and
- a first and a second pair of terminals on said outer surface of said body, each of said pair of terminals adapted to be connected to a pair of subscriber wires, each of said pair of terminals electrically connected through said body to said to said inner surface of said body proximate said supporting surface, wherein said outer surface of said body is capable of shielding a pair of remote isolation devices secured to said supporting surface from subscriber contact, and wherein said mounting unit is sized and shaped to fit within said housing of said previously installed surge protector device.

17. The retrofit interface apparatus of claim 16, wherein each of of said pair of receiving elements comprises a pair of openings.

18. The retrofit interface apparatus of claim 17, wherein each opening of said pair of openings includes a first area having a larger width sufficient that a standard surge post nut can be inserted axially through such first area without interference, and a second area having a smaller width such that a portion of said base surrounding said second area of said opening will prevent a standard surge post nut from moving axially through said second area.

19. The mounting unit of claim 16, wherein said pairs of terminals comprise screws having heads which abut the inner surface of said body.

* * * * *

UNITED STATES PATENT AND TRADEMARK OFFICE
CERTIFICATE OF CORRECTION

PATENT NO. : 5,363,442
DATED : November 8, 1994
INVENTOR(S) : Donald F. Dernbach, et. al.

It is certified that error appears in the above-indentified patent and that said Letters Patent is hereby corrected as shown below:

Column 1, line 51, delete "little timed, and", and insert --little time, and--.
Column 6, line 58, delete "to slid under", and insert --to slip under--.
Column 12, line 23, delete "cover. In In a ", and insert --cover. In a--.
Column 14, line 19, delete "of Dumper leads", and insert --of jumper leads--.
Column 15, line 48, delete "interface of claim", and insert --interface apparatus of claim--.

Signed and Sealed this

Twelfth Day of September, 1995

Attest:

BRUCE LEHMAN

Attesting Officer

Commissioner of Patents and Trademarks